United States Patent
Butler (10) Patent No.: US 10,479,154 B2
(45) Date of Patent: Nov. 19, 2019

(54) UTILITY SLED

(71) Applicant: David Butler, Elizabeth, NC (US)

(72) Inventor: David Butler, Elizabeth, NC (US)

( * ) Notice: Subject to any disclaimer, the term of this patent is extended or adjusted under 35 U.S.C. 154(b) by 207 days.

(21) Appl. No.: 15/475,387

(22) Filed: Mar. 31, 2017

(65) Prior Publication Data

US 2017/0282661 A1 Oct. 5, 2017

Related U.S. Application Data

(60) Provisional application No. 62/390,487, filed on Apr. 1, 2016.

(51) Int. Cl.
| | | |
|---|---|---|
| *B62B 15/00* | (2006.01) | |
| *B60F 3/00* | (2006.01) | |
| *B63B 35/73* | (2006.01) | |

(52) U.S. Cl.
CPC .......... *B60F 3/0092* (2013.01); *B60F 3/0007* (2013.01); *B62B 15/007* (2013.01); *B62B 15/008* (2013.01); *B63B 35/73* (2013.01); *B62B 15/003* (2013.01); *B62B 2202/402* (2013.01); *B62B 2202/42* (2013.01); *B63B 2035/738* (2013.01)

(58) Field of Classification Search
CPC ................ B62B 13/18; B62B 2205/20; B62B 2205/145
See application file for complete search history.

(56) References Cited

U.S. PATENT DOCUMENTS

| | | | | |
|---|---|---|---|---|
| 1,164,332 A | * | 12/1915 | Brown | B62B 13/18 280/43.24 |
| 1,607,283 A | * | 11/1926 | Korn | B62B 13/18 280/11 |
| 2,926,021 A | * | 2/1960 | Altadonna | B62B 1/20 280/11 |
| 3,179,961 A | * | 4/1965 | Ward | B63B 3/16 114/356 |
| 3,195,919 A | * | 7/1965 | Lossman | B63C 13/00 114/344 |
| 3,281,874 A | * | 11/1966 | Sholl | B63C 13/00 114/344 |
| 3,284,821 A | * | 11/1966 | Zoretic | B63C 13/00 114/344 |
| 3,428,328 A | * | 2/1969 | Dickson | A01D 34/74 280/43.17 |
| 3,659,865 A | * | 5/1972 | Nothacker | B60N 2/2839 280/31 |

(Continued)

*Primary Examiner* — James A Shriver, II
*Assistant Examiner* — Vaughn Coolman
(74) *Attorney, Agent, or Firm* — Bradley D. Goldizen (57) ABSTRACT

A utility sled is formed from a lightweight material and includes a handle flexibly attached to the front end thereof. The handle includes a hook that is seated within a small opening of the utility sled when not in use. A pair of retractable wheels is attached to an exterior of each sidewall of the utility sled. The sidewalls are biased outward when no load is present. When loaded, the sidewalls advantageously tend to straighten vertically. The formed bottom of the sled includes a plurality of ribs which both add strength to the sled as well as function as sled runners when the wheels are retracted. The ribs operate to reduce friction between the sled bottom and the underlying surface.

15 Claims, 9 Drawing Sheets

(56) References Cited

U.S. PATENT DOCUMENTS

| | | | | |
|---|---|---|---|---|
| 3,916,466 A * | 11/1975 | Davidson | B63C 15/00 | 114/356 |
| 4,239,247 A * | 12/1980 | Hinz | E04H 15/001 | 135/133 |
| 4,515,102 A * | 5/1985 | Kury | B63C 13/00 | 114/344 |
| 4,526,391 A * | 7/1985 | Winkelman | E04H 1/1205 | 135/87 |
| 4,709,648 A * | 12/1987 | Andrews | B63B 29/04 | 114/363 |
| 5,106,109 A * | 4/1992 | Tattersall | B62B 13/18 | 152/9 |
| 5,197,405 A * | 3/1993 | King | B63C 13/00 | 114/344 |
| 5,653,455 A * | 8/1997 | Richards | B62B 5/068 | 280/1.5 |
| 5,678,346 A * | 10/1997 | Kellett | A01M 31/06 | 135/901 |
| 6,189,478 B1 * | 2/2001 | Myers | B63C 13/00 | 114/344 |
| 7,575,241 B1 * | 8/2009 | Keller | A01M 31/025 | 135/901 |
| 7,959,182 B2 * | 6/2011 | Klein | A01K 97/01 | 280/47.18 |
| 9,296,408 B1 * | 3/2016 | Springwater | B62B 15/00 | |
| 9,371,080 B2 * | 6/2016 | Dilone, Jr. | B62B 1/125 | |
| 10,029,722 B1 * | 7/2018 | Springwater | B62B 15/009 | |
| 2006/0181038 A1 * | 8/2006 | Walter | B62B 5/0013 | 280/19.1 |
| 2006/0181042 A1 * | 8/2006 | Sawyer, III | A01K 27/00 | 280/63 |
| 2007/0176382 A1 * | 8/2007 | Truchsess | B62K 5/00 | 280/87.05 |
| 2009/0146387 A1 * | 6/2009 | Klein | A01K 97/01 | 280/30 |
| 2009/0283978 A1 * | 11/2009 | Fitzgerald | B62B 7/00 | 280/20 |
| 2013/0249176 A1 * | 9/2013 | Bengtzen | A45C 5/14 | 280/30 |
| 2017/0291658 A1 * | 10/2017 | Somerset | F16F 15/043 | |

* cited by examiner

UTILITY SLED

The present application relates to and claims priority from U.S. Provisional Patent Application Ser. No. 62/390,487 filed on Apr. 1, 2016.

This application did not receive federal research and development funding.

TECHNICAL FIELD

The present invention generally relates to a waterproof utility sled having a substantially rigid body that defines a plurality of runners on a bottom of a hauling area into which materials and game may be deposited. More particularly, the invention relates to a utility sled having retractable wheels and a flexible pulling point that comprises a hook which serves to secure the flexible pulling point to the substantially rigid body via a small opening arranged in a lip at the front of the sled. The sidewalls of the sled are biased outward when the sled is unloaded and are straightened when a load is deposited into the hauling area. Further, the sled is floatable and may be dragged across the surface of a body of water or coupled to a boat to transport materials across water.

BACKGROUND OF THE INVENTION

Sleds have been used for many years to transport materials. Snow sleds are typically made from material such as wood and include metal runners upon which the sled rides. Other sleds are comprised of lightweight formed materials such as plastic.

SUMMARY OF THE INVENTION

The invention is a utility sled that comprises a formed body having a lip which extends outward from the upper edge thereof and is rolled downward. Longitudinal ribs are formed on the bottom of the sled and extend downward to concentrate the weight of the sled and any contained items thereon. An exterior of the sled is smooth to reduce friction between the sled and the underlying ground. The front end of the sled is curved from the bottom upward in a swept shape to assist the user during use. A pair of retractable wheels is affixed on opposite sides of the sled with a wheel being arranged substantially near the front end and another substantially near the back end. The back wheels may be larger in diameter than the front wheels to bias the weight of the sled forward to assist the user when the wheels are deployed for use across hard surfaces such as roadway surfaces.

A rigid hollow handle comprises a J-hook and a rope which is affixed to the front end of the sled. The J-hook extends from substantially the center of the handle. The rope is stored by winding it around the handle when not in use. An opening is provided in the front of the sled to accept the J-hook when the handle is not in use. When the hook is removed from its storage opening it may be used as a leverage point by securing one end of another rope to a fixed object and passing the rope through the J-hook. In this manner, the sled and its contents may be lowered over rough inclined surfaces. For instance, one end of a rope may be secured to a fixed object such as a tree, the rope is then passed through the J-hook giving the user a mechanical advantage which aids in retrieval of the sled and its contents.

The sidewalls of the body are flared outward such that the top of the sled is wider than the bottom when not loaded. When loaded, the top of the sidewalls is pulled towards one another to straighten the wheels. The overall length of the sled is long enough such that a heavily-loaded sled is easily deposited into the bed of a pickup truck. The user simply grasps the front of the sled and lifts it onto the tailgate such that an inclined plane is achieved. Thereafter, the user may grasp the lip of the sled near the rear and lift the sled while sliding it into the pickup bed. Reinforced regions of the sled provide sidewall rigidity and mounting support for the wheels.

An object of the invention is to provide a sled having a body which may be slid over rough terrain and equipped with retractable wheels which deploy when traversing smooth or substantially flat surfaces such as those presented on roadways.

A further object of the invention is to provide the user with a game sled for use in easy retrieval of large game. The game sled may be slid across rough terrain with the wheels retracted or pulled across a hard roadway surface when the wheels are deployed. The sled may be used to float game across a body of water.

A further object of the invention is to provide a sled having a handle which includes a hook for assisting the user in pulling the sled uphill or lowering the sled downhill with the assistance of another rope.

Additional objects and advantages of the invention will be set further in part in the description which follows, and in part will be obvious from the description, or may be learned from practicing the invention. The objects and advantages of the invention will be obtained by means of instrumentalities in combinations particularly pointed out in the appended claims.

DETAILED DESCRIPTION OF THE DRAWINGS

Figure 1:
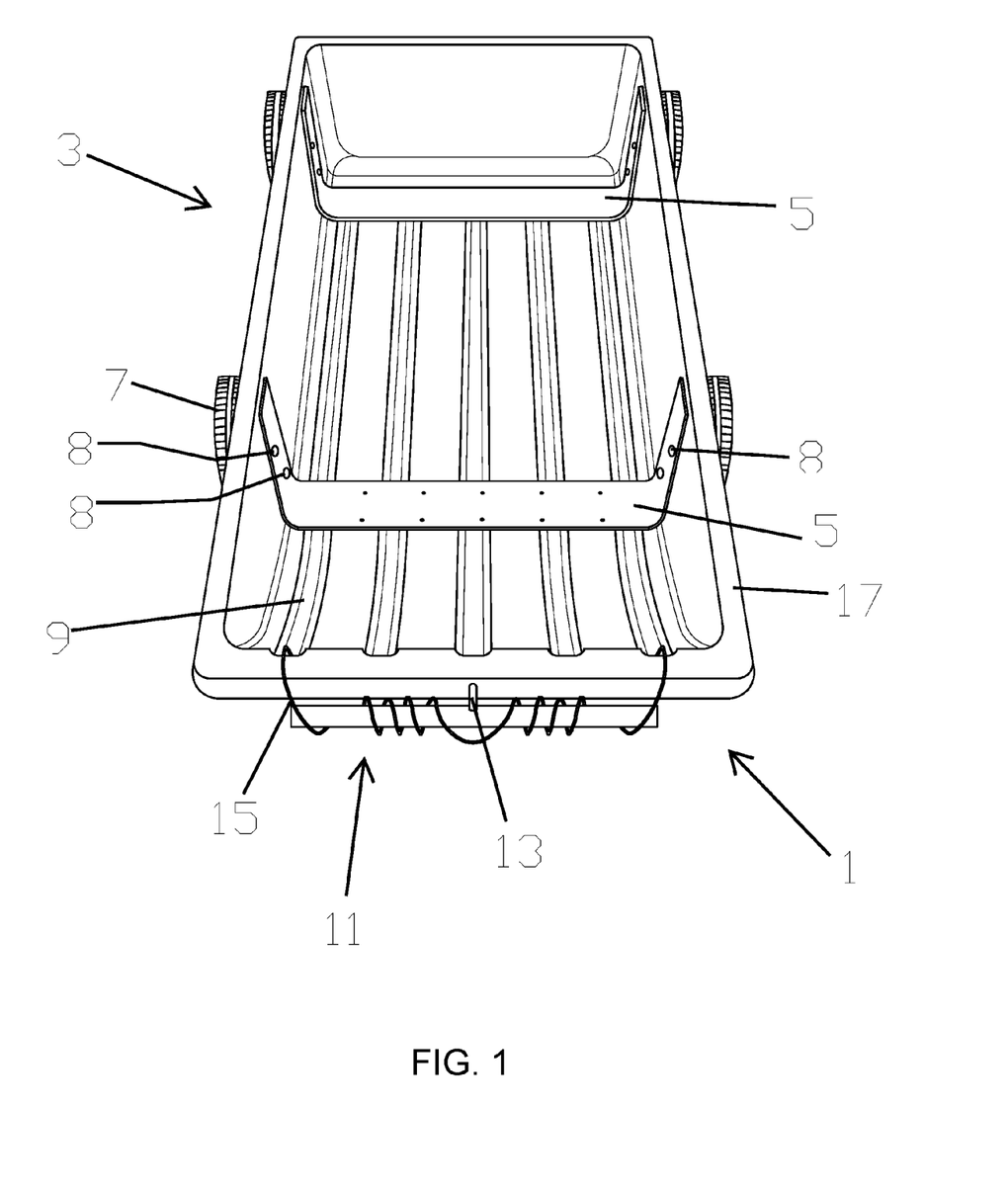
FIG. 1 is a perspective view of the invention taken from above and showing an interior of the sled from the front.
Figure 5:
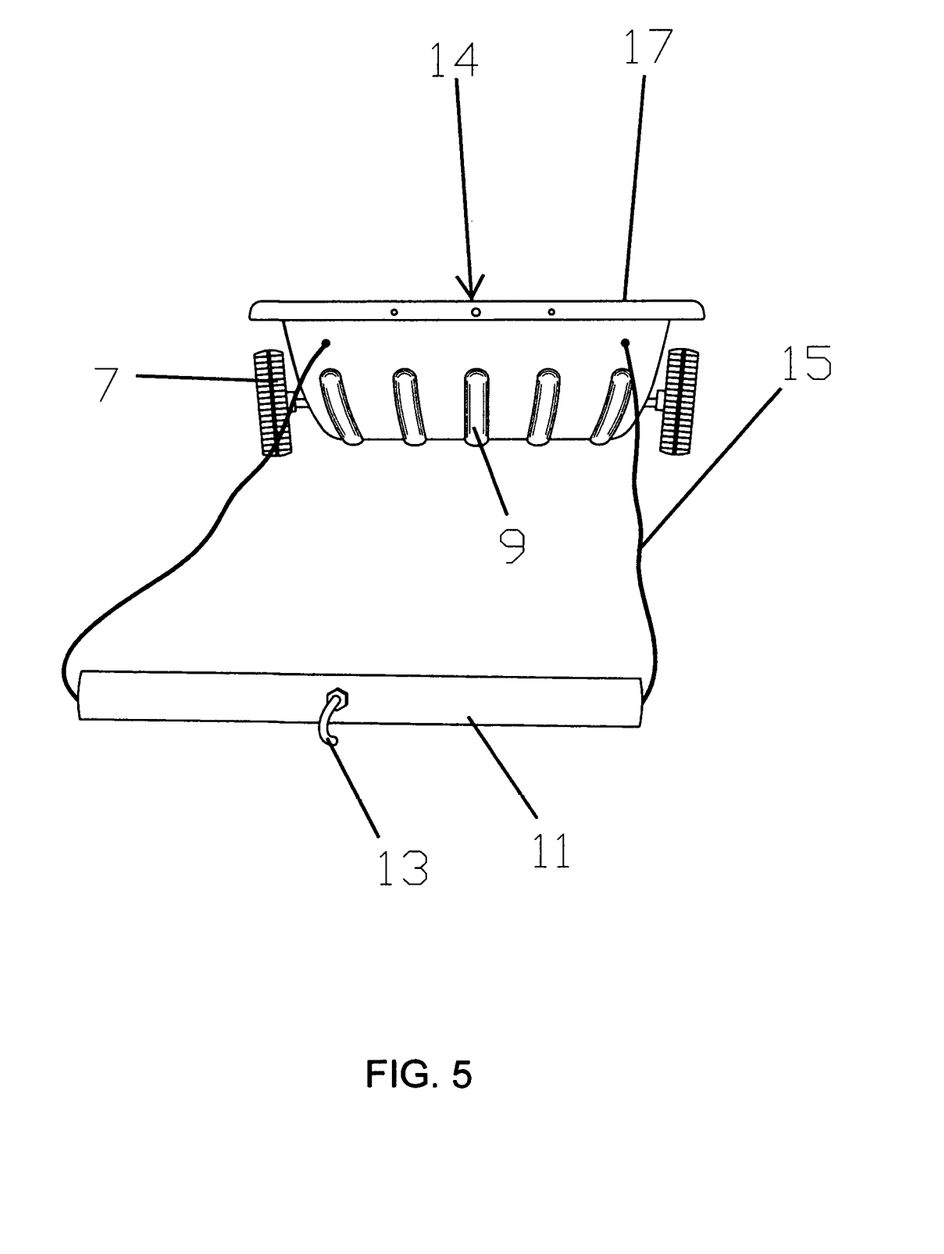
FIG. 5 is a front view showing the handle extended.

FIG. 1 shows a perspective view the interior of the sled 1. The sled includes a body 3 that is generally formed from a plastic material such as polyethylene and may be molded or blow molded in a known manner. A first U-shaped support 5 is provided substantially at one-third of the overall distance between the front and the rear of the sled. The front of the sled is swept upwards in a curved fashion such that the front of the sled near the top extends outward and forward from the bottom. A second U-shaped support 5 is provided substantially near the rear of the sled. These U-shaped supports 5 stabilize the sled and provide rigidity to prevent racking of the body 3 when the sled 1 is loaded. The U-shaped supports 5 also provide a solid surface for attaching the wheels 7 to the sled 1. Bolts 8 extend through the sidewalls of the body 3 to fasten wheel deploying devices 20 as more clearly shown in FIG. 7. A plurality of ribs 9 are formed along the bottom of the sled 1. A lip 17 extends around the open top of the sled for providing an easily gripping surface for holding and maneuvering the sled 1. A handle 11 is shown in a stowed condition with a J-hook 13 arranged within an opening 14 (shown in FIG. 5). The handle 11 is fastened at opposite ends to the sled 1 via flexible members 15 which may be rope or cables. The flexible members 15 are wound about the handle 11 when it is stowed. In a preferred embodiment, the handle 11 is cylindrical in shape. As can be seen, the opening at the top of the sled is larger than the bottom or floor of the sled. This causes the sidewalls to be biased outward at the top which in turn creates a positive camber on the wheels when the sled is unloaded. When a load is placed in the sled, substantially zero camber is achieved.

Figure 2:
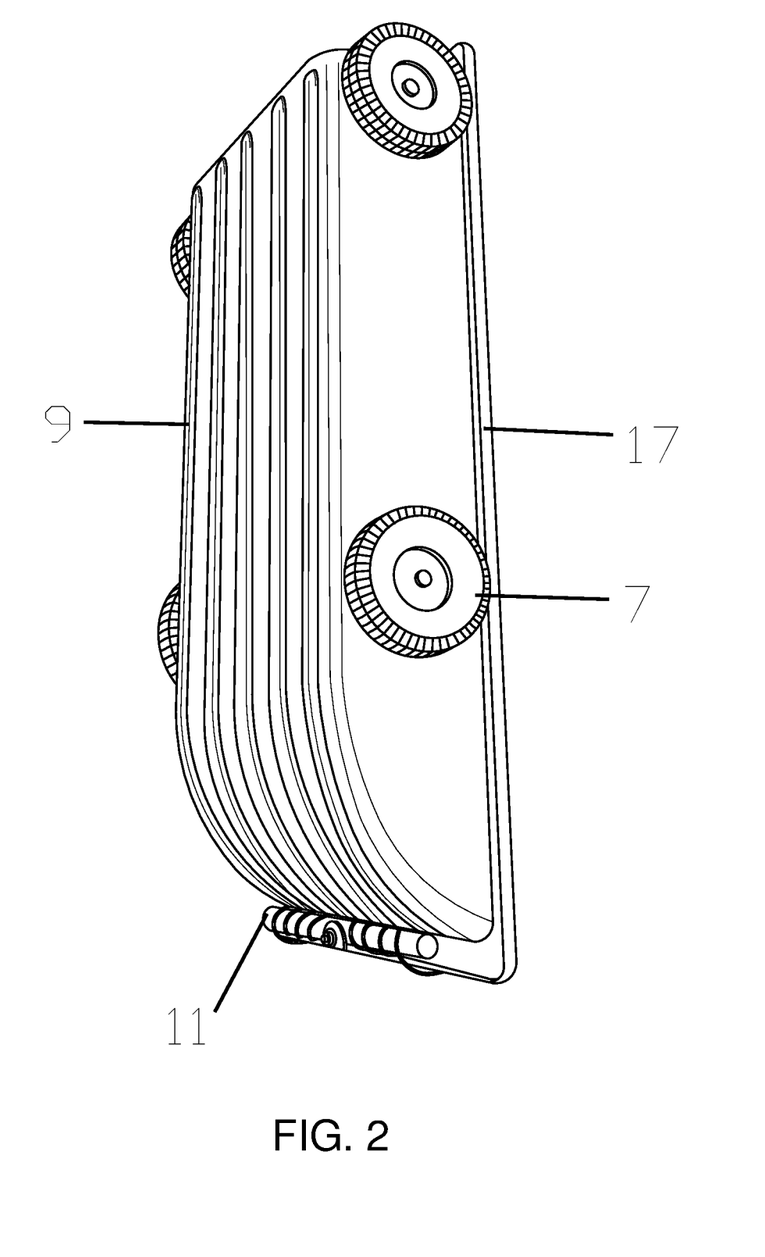
FIG. 2 shows a perspective bottom view of the sled with the handle stowed.

FIG. 2 is a bottom view of the sled 1 and showing the wheels in a retracted position. As can be recognized when viewing FIG. 7, the wheel deploying devices 20 may be used to raise and lower the wheels 7 to a variety of heights for various surfaces. For instance, the wheels 7 may be raised to a maximum height when the sled 1 is used in an environment where obstacles such as sticks are present. When used on a snow-covered surface, the wheels 7 may be retracted to allow the sled 1 to ride on the ribs 9. The longitudinally formed ribs reduce friction when the wheels are retracted. In the preferred embodiment, the five ribs are provided along the bottom of the sled. However, it should be recognized that any number of ribs may be formed. Preferably, a rib extends along the bottom of the sled near each sidewall to ensure stability of the sled during use. Thus, the width between the outermost ribs should be substantially equal to the overall width of the bottom to prevent the materials contained within the sled from shifting and tipping the sled over. As shown, the handle 11 is stowed beneath the lip 17 in the front of the sled when not in use. The front of the sled is swept upwards to facilitate it being pulled across large obstacles.

Figure 3:
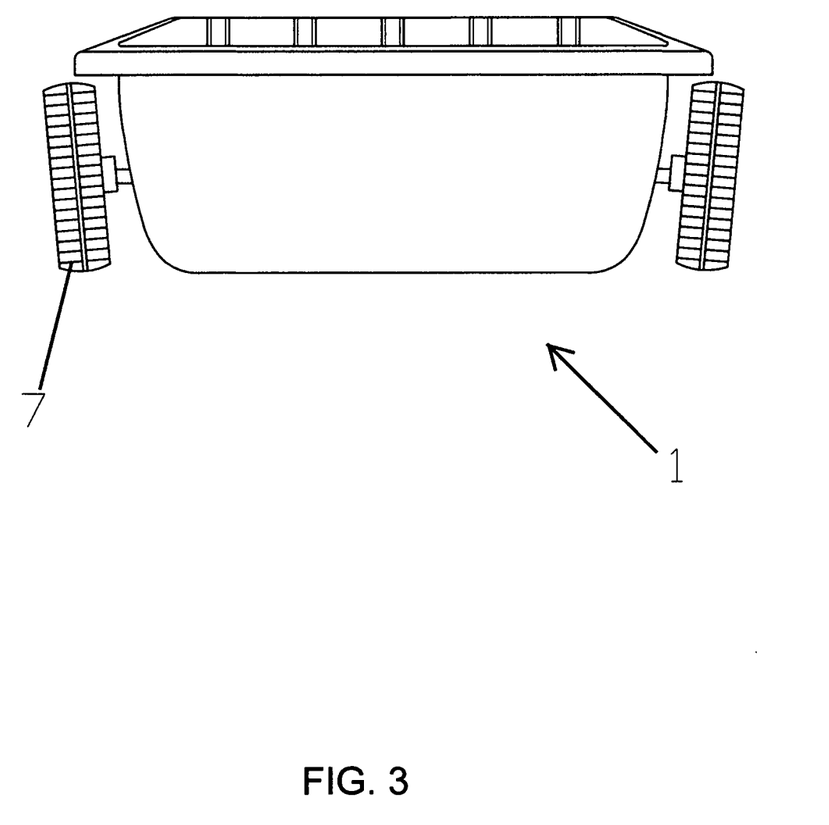
FIG. 3 is a back elevated view of the sled.

FIG. 3 is a back view of the sled 1 and showing the wheels 7 in a retracted position. As can be recognized, the bottom of the wheels is slightly elevated above the bottom of the sled. In this instance, the wheels operate as outriggers assisting in stabilizing the sled when the sled tilts to one side or the other.

Figure 4:
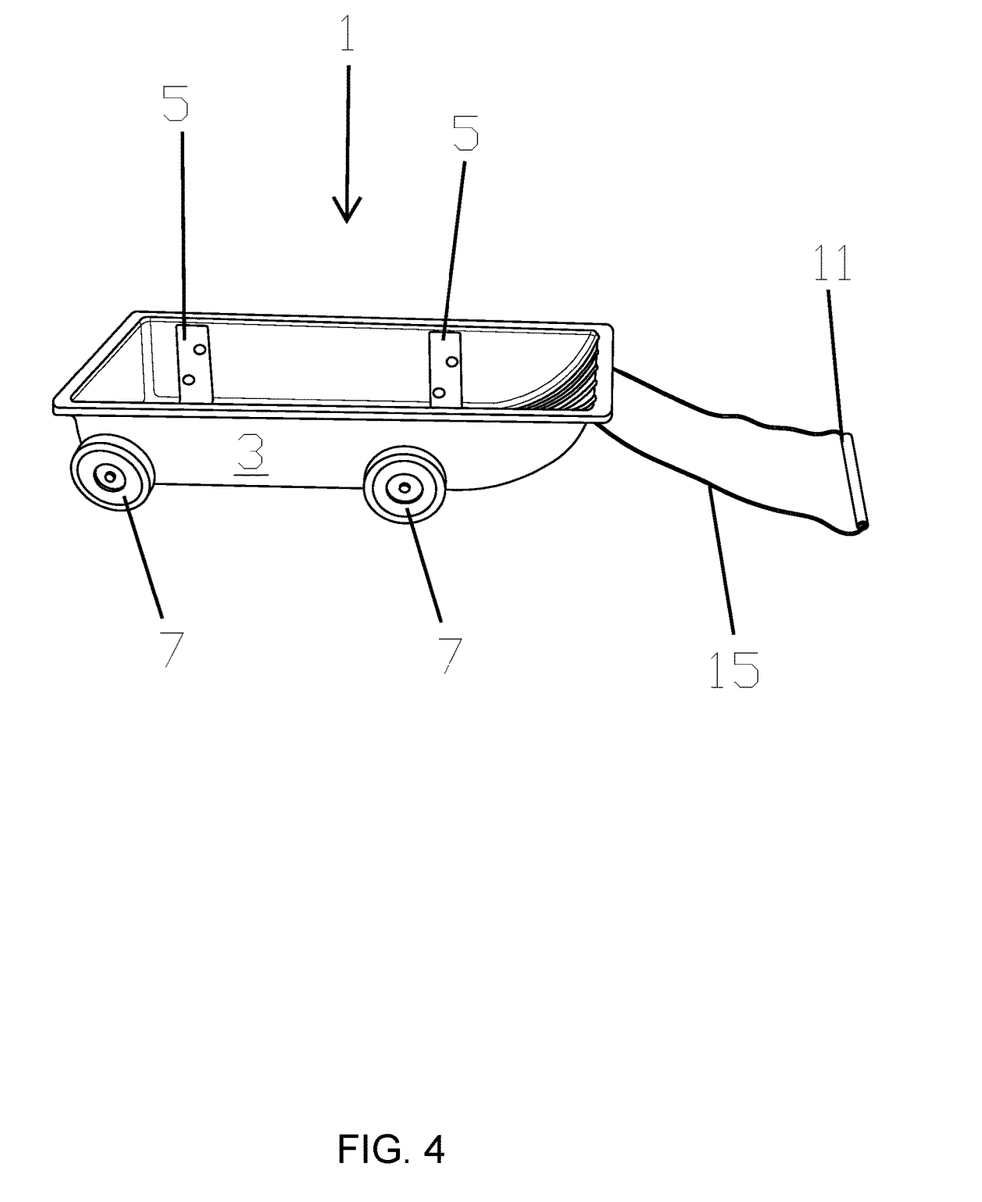
FIG. 4 is an elevated side view showing the handle extended.
Figure 6:
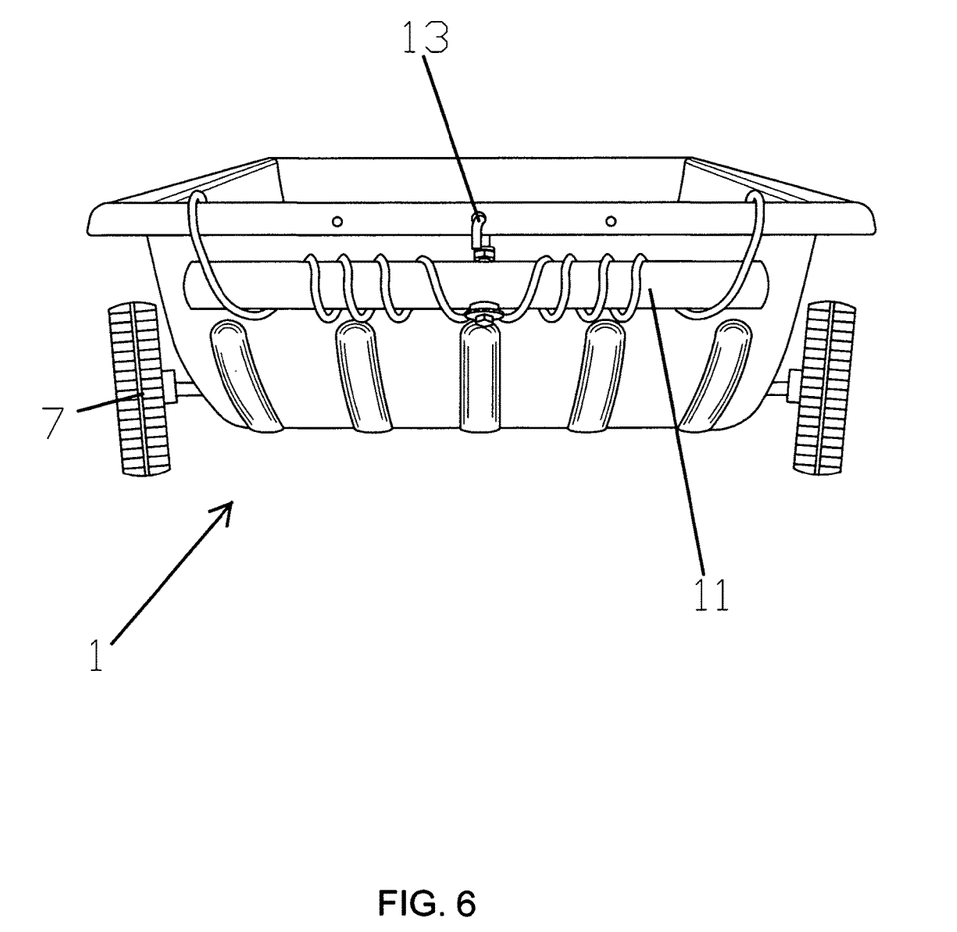
FIG. 6 is a front view showing the handle stowed.

FIG. 4 is a perspective view of the sled 1 showing the handle 11 extended forward of the sled. In the preferred embodiment, the handle 11 is formed from a rigid pipe material such as PVC which is both lightweight and durable. The handle 11 is coupled to the front of the sled via a lightweight rope 15 which is secured to the sled at opposite ends. The rope 15 preferably extend through a central opening in the handle 11. A J-hook 13 (shown more clearly in FIGS. 5 and 6) is fastened substantially at the center of the handle for use as both a mechanical advantage and to store the handle when it is not in use. The handle 11 is stowed by simply rolling the rope 15 about is and fastening the J-hook 13 into opening 14 (shown in FIG. 5) which is arranged in the lip 17. The rope 15 may be formed from polypropylene or other lightweight durable material and preferably includes UV inhibitors to prevent breakdown of the rope by exposure to sunlight. Likewise, the sled 1 preferably includes UV inhibitors to ensure longevity.

Figure 7:
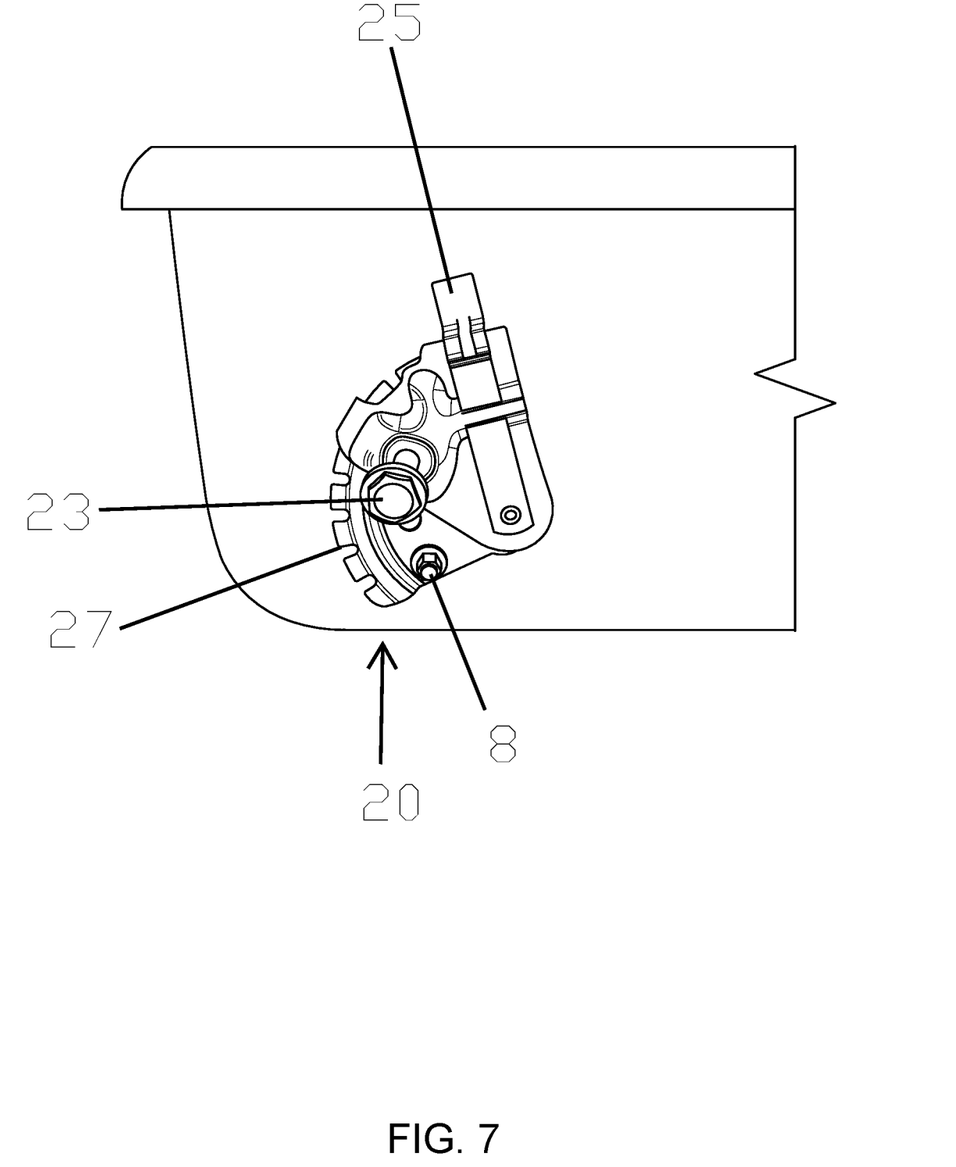
FIG. 7 is an enlarged view of a wheel deploying device for raising and lowering the wheels of the sled.

FIG. 7 depicts a wheel deploying mechanism 20 which is arranged on an exterior of the sled. As can be recognized, an axel bolt 23 is provided for securing a wheel to the wheel deploying mechanism 20. The mechanism includes a plurality of slots 27 which selectively receive a portion of handle 25 to allow the wheel attached thereto to be raised and lowered as desired. Bolts 8 secure the wheel deploying mechanism 20 to the sidewall and the U-shaped bracket 5.

Figure 8:
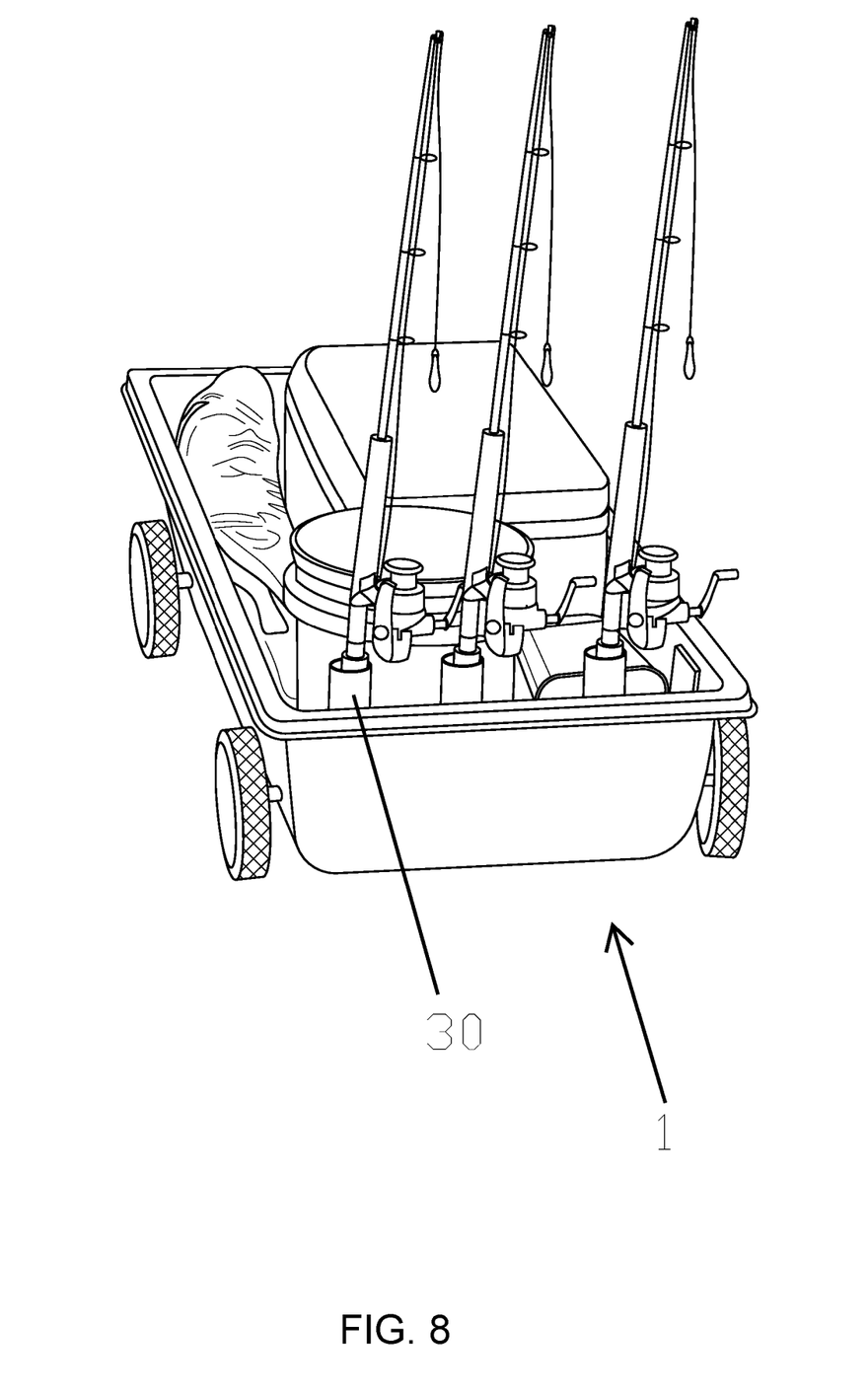
FIG. 8 shows a perspective view of the sled loaded with various items and including a rod holder fastened at the back of the sled.
Figure 9:
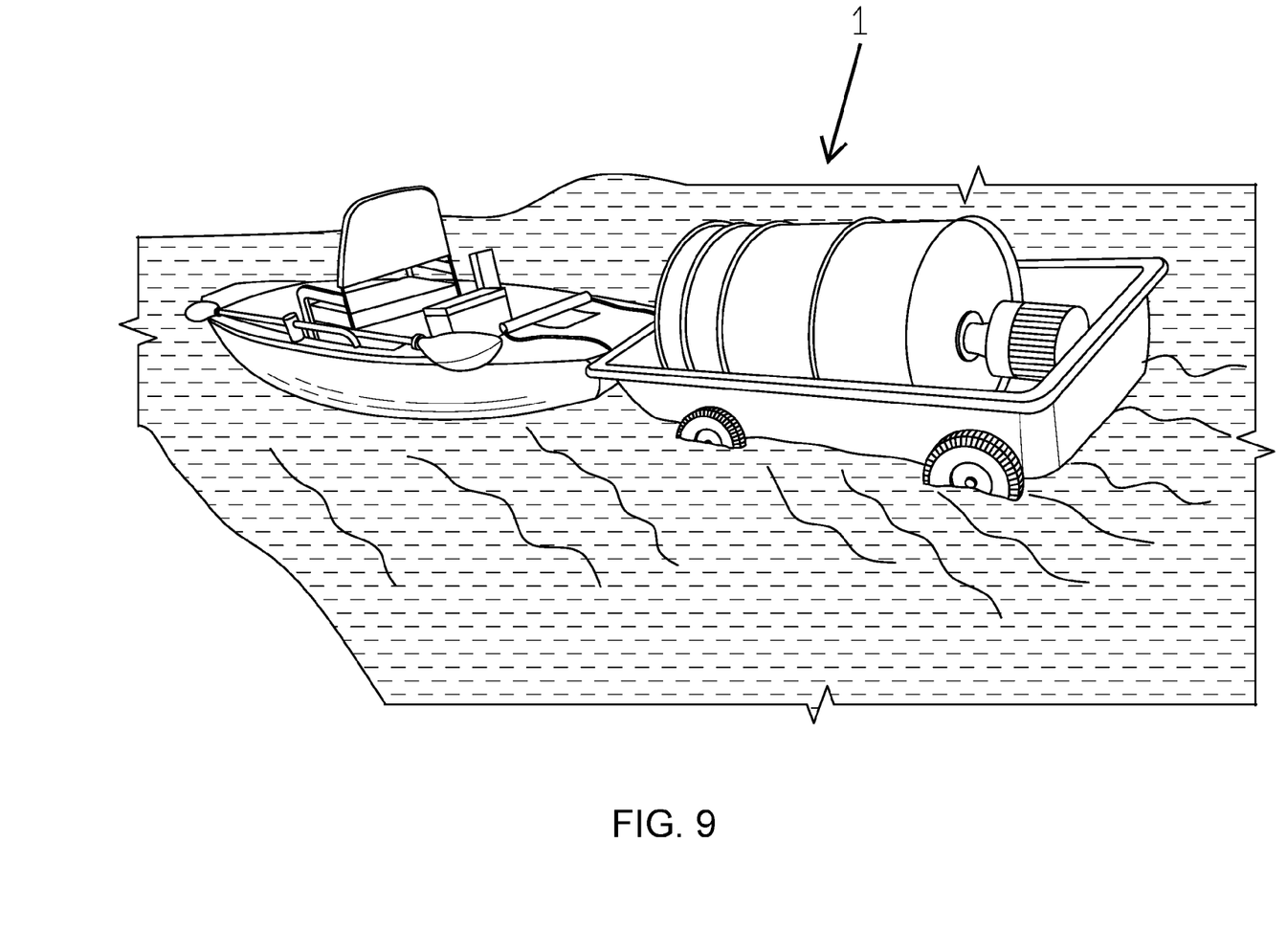
FIG. 9 shows the sled being towed by a boat across a mud flat.

FIG. 8 shows a loaded sled 1 having a rod holder 30 into which a plurality of fishing rods are deposited. FIG. 9 shows the loaded sled being pulled by a boat across mud flats. As can be understood from FIG. 9, the sled 1 is waterproof and may be utilized with a waterborne conveyance such as a boat or canoe to transport materials across water.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modification to which the present invention is susceptible. Therefore, the scope of the invention should be limited only by the following claims and equivalents thereof.

I claim:

1. A utility sled comprising: a body having an interior defined by a front wall, a back wall, a pair of sidewalls extending from the front wall to the back wall on opposite sides of a bottom and an open top surrounded by a lip, said body formed from plastic, the open top of the sled being larger than the bottom of the sled; a first U-shaped support having two ends and being fastened between the pair of sidewalls substantially near the front wall at one-third of the distance between the front wall and the back wall of the sled such that each of the two ends extend upward along a respective sidewall; a second U-shaped support having two ends and being fastened between the pair of sidewalls substantially near the back wall of the sled such that each of the two ends extend upward along a respective sidewall; four wheel deploying devices fastened to an exterior of the sled and to a respective end of a U-shaped support, each of said wheel deploying devices comprising an adjustment handle which raises and lowers an axel bolt such that a plurality of slots selectively receive a portion of the handle to adjust a height of the axel bolt; a wheel being attached to each of said axel bolts of each of the wheel deploying devices to allow the wheel to be deployed and retracted; a handle attached to the front wall of the sled via a flexible member and comprising a J-hook; and, an opening in said lip of the sled in the front wall, said opening receiving the J-hook of the handle to stow the handle; wherein the sidewalls are biased outward to create a positive camber on the wheels when the sled is unloaded and when a load is placed in the sled, the sidewalls are pulled inward at a top such that the wheels are adjusted to substantially zero camber.

2. The sled of claim 1 wherein the handle is formed from a rigid pipe material.

3. The sled of claim 2 wherein said handle is formed from PVC.

4. The sled of claim 1 is formed from polyethylene.

5. The sled of claim 1 wherein a rib extends along the bottom of the sled near each sidewall to ensure stability of the sled during use.

6. The sled of claim 1 wherein the bottom comprises a plurality of longitudinal ribs extending from the front to the back of the sled.

7. The sled of claim 1 wherein the flexible member is wound about the handle when the handle is stowed.

8. A sled comprising: a body having a front wall, a back wall, a pair of sidewalls extending from the front wall to the back wall, a bottom which comprises longitudinal ribs extending from said front wall to said back wall, an open top defined by a lip which extends along the front wall, back wall and the pair of sidewalls; a pair of wheels attached to an exterior of said body along each sidewall; u-shaped supports extending from one sidewall to the other sidewall across the bottom of the sled; a wheel deployment mechanism arranged between the exterior of said body and each wheel, each wheel deployment mechanism having a handle for lowering and raising a wheel attached thereto; and, a handle flexibly attached to the front wall of the sled; wherein the sidewalls are biased outward to create a positive camber on the wheels when the sled is unloaded and when a load is placed in the sled, the sidewalls are pulled inward at a top such that the wheels are adjusted to substantially zero camber.

9. The sled of claim 8 wherein the handle is formed from a rigid pipe material.

10. The sled of claim 9 wherein said handle is formed from PVC.

11. The sled of claim 8 wherein a flexible member coupling the handle to the front wall of the sled is wound about the handle when the handle is stowed.

12. The sled of claim 8 is formed from polyethylene.

13. The sled of claim 8 wherein a rib extends along the bottom of the sled near each sidewall to ensure stability of the sled during use.

14. The sled of claim 8 wherein the bottom comprises a plurality of longitudinal ribs extending from the front wall to the back wall of the sled.

15. A utility sled comprising: a body having an interior defined by a front wall, a back wall, a pair of sidewalls extending from the front wall to the back wall on opposite sides of a bottom comprising a plurality of longitudinal ribs extending from the front to the back of the sled, and an open top surrounded by a lip, said body formed from plastic, the open top of the sled being larger than the bottom of the sled; a first U-shaped support having two ends and being fastened between the pair of sidewalls substantially near the front wall at one-third of the distance between the front wall and the back wall of the sled such that each of the two ends extend upward along a respective sidewall; a second U-shaped support having two ends and being fastened between the pair of sidewalls substantially near the back wall of the sled such that each of the two ends extend upward along a respective sidewall; four wheel deploying devices fastened to an exterior of the sled and to a respective end of a U-shaped support, each of said wheel deploying devices comprising an adjustment handle which raises and lowers an axel bolt such that a plurality of slots selectively receive a portion of the handle to adjust a height of the axel bolt; a wheel being attached to each of said axel bolts of each of the wheel deploying devices to allow the wheel to be deployed and retracted; and, a handle attached to the front wall of the sled via a flexible member and comprising a J-hook; an opening in said lip of the sled in the front wall, said opening receiving the J-hook of the handle to stow the handle wherein the flexible member is wound about the handle when the handle is stowed, said handle comprising rigid PVC pipe; wherein the sidewalls are biased outward to create a positive camber on the wheels when the sled is unloaded and when a load is placed in the sled, the sidewalls are pulled inward at a top such that the wheels are adjusted to substantially zero camber.

\* \* \* \* \*